Dec. 9, 1952      C. DAHLBERG      2,620,917
GARMENT HANDLING MEANS
Filed Feb. 28, 1949      2 SHEETS—SHEET 1
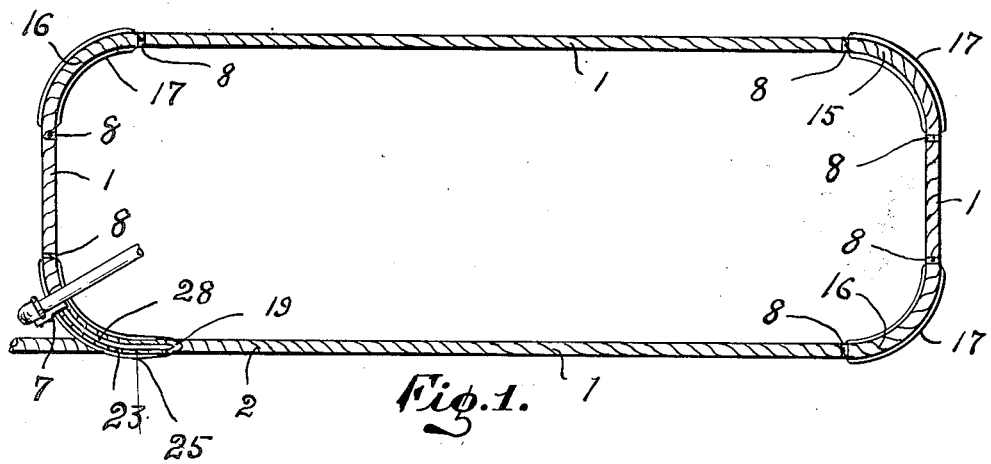
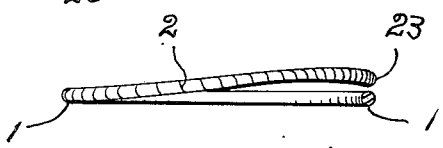
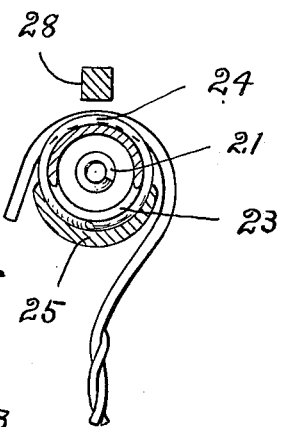
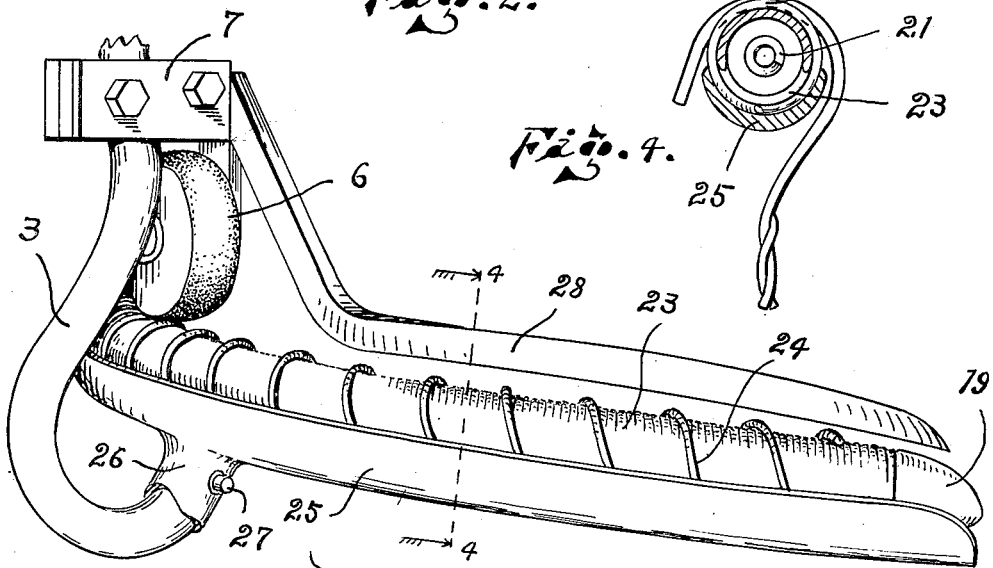
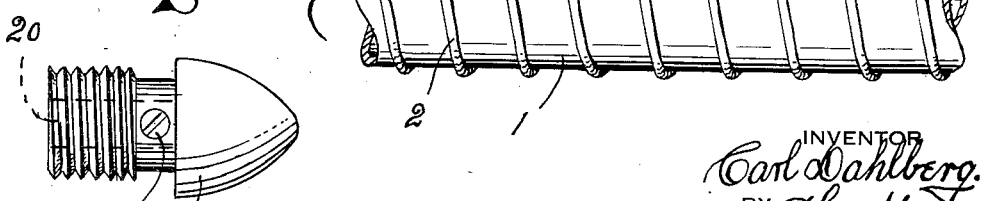
INVENTOR
Carl Dahlberg.
BY Geo Stevens
ATTORNEY

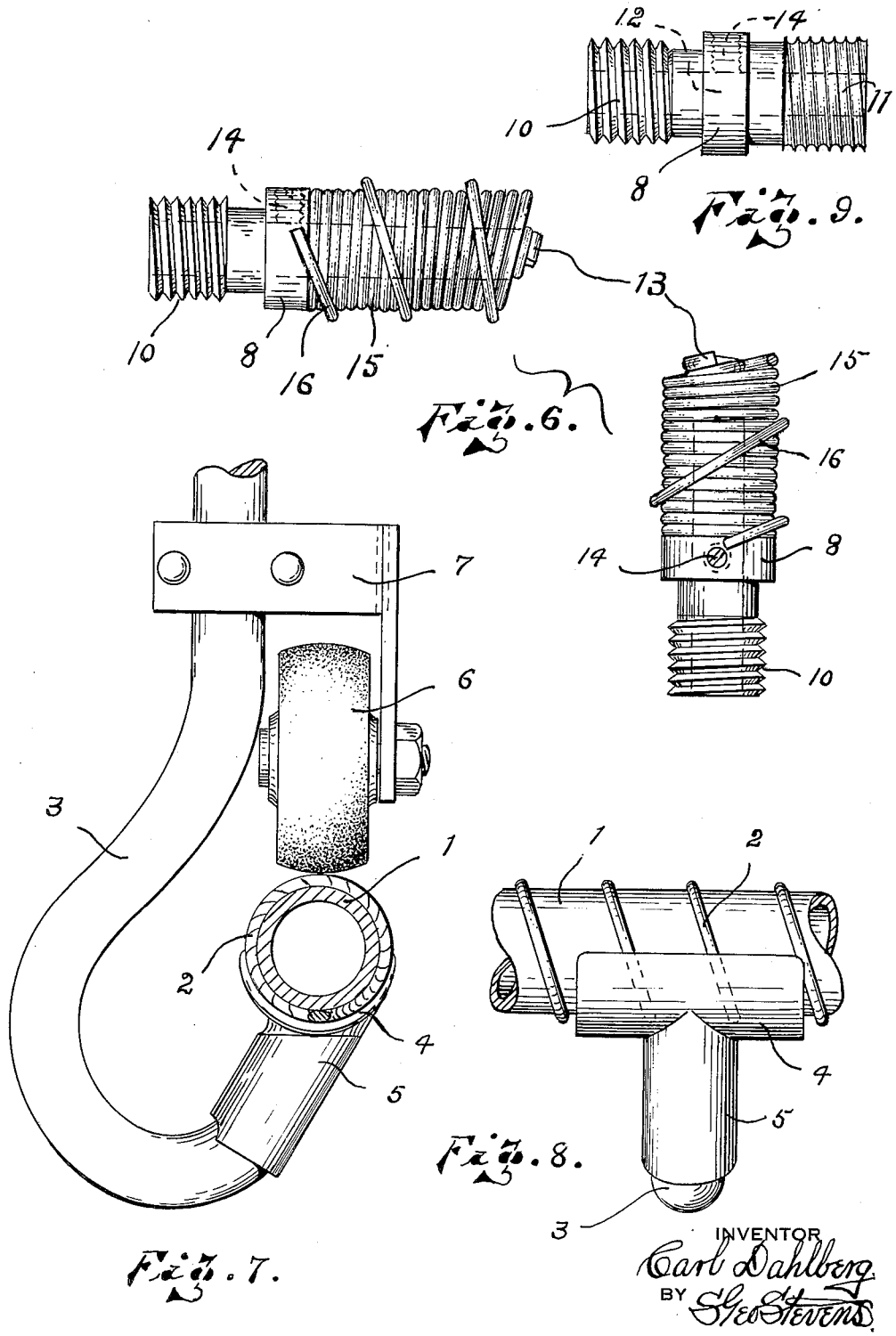

Patented Dec. 9, 1952

2,620,917

UNITED STATES PATENT OFFICE 2,620,917

GARMENT HANDLING MEANS

Carl Dahlberg, Duluth, Minn., assignor of one-half to Martin I. Friedman, Duluth, Minn.

Application February 28, 1949, Serial No. 78,871

9 Claims. (Cl. 198—213)

This invention relates to a device for conveying garments on hangers from one location to another such as in dry cleaning establishments where garments must be transported from one department to another for different operations to be performed thereon.

One of the principal objects of the instant invention is to provide an axially rotatable track having a spiral arrangement on its outer surface to engage and move objects, such as garments, which are carried on hanging devices, such as garment hangers, which have hooks that may be engaged over and hung on the track to depend therefrom.

Another of the principal objects of the invention is to provide means for conveying objects, as above set forth, around corners by means of an axially rotating device.

Another object is to provide means for transferring objects conveyed as above set forth from one conveyor track to another.

Another object is to drive straight portions of continuous conveyor track which run at angles to each other by means of an axially rotating flexible corner member which also forms a part of the conveyor system.

Another object is to provide a novel flexible conveyor member to be used for making bends in a continuous axially rotating conveyor track.

Another object is to provide means to support a conveyor track and still permit hangers to have continuous uninterrupted travel, and to provide means for supporting the flexible portions of the track.

Another object is to provide bearings on which the track may be supported which are easily replaced when worn.

Another object is to provide means for connecting the rigid straight portions of the track to the flexible portions which are used to round corners.

A still further object is to provide means for holding the axially rotating track in its place on the bearings provided therefor.

These and other objects and advantages will become more apparent as the description of the invention proceeds.

In the accompanying drawing forming a part of this application:

Fig. 1 is a top plan view of a conveyor arrangement illustrating some modes in which my invention may be employed.

Fig. 2 is an end elevational view of the track alone which is shown in Fig. 1.

Fig. 3 is an enlarged side elevational view of the mechanism for transferring garments from one track to another.

Fig. 4 is a sectional view on the line 4—4, Fig. 3.

Fig. 5 is an elevational view of the end member for the flexible track.

Fig. 6 is a broken top plan view of one of the flexible track sections.

Fig. 7 is a sectional view of the track showing one means of supporting same.

Fig. 8 is a front elevational view of the lower portion of Fig. 7.

Fig. 9 is an elevational view of a coupling member for uniting the flexible track sections with the rigid sections.

In the drawing, the reference numeral 1 indicates rigid sections of straight track, preferably tubular, having a spiral arranged on its outer surface, the spiral being shown as comprising wire 2 wound helically around the track to form a screw.

As shown in Figs. 7 and 8, the track 1 is supported in a position at sufficient elevation from the floor by means of hooks 3 which may be suspended in any suitable manner, as from the ceiling or from suitable wall brackets if convenient; and saddle bearings 4, carried by the hooks 3, in which the track rests as clearly illustrated in the drawings, the bearings being substantially semicircular in cross section, and the number of hooks and bearings used being, of course, dependent upon the length of track to be supported and the availability of hook suspending means.

As shown in the drawings, the hooks 3 are bent rearwardly from their shank, and then around to project forwardly and upwardly. The saddle bearing 4 has a tubular stem 5 welded thereto which fits over the end of the hook to hold the bearing in place.

Rollers 6, preferably of rubber, are used to hold the track down in its proper setting in the bearings 4, the rollers being carried on brackets 7 attached to the shanks of the hooks 3.

The straight sections 1 of track may be rotated by any suitable means, not shown, such as an electric motor with proper gears or pulleys to drive the track at the desired R. P. M., the drive being connected at one end only of the track. It is apparent that as the track is rotated, the spiral arrangement on its outer surface will cause a garment hanger which is hung on the track (see Fig. 4), to move longitudinally of the track, and thus garments may be transported from one place to another without assistance or attendance by human beings except for putting them on and taking them off the track, the bearings 4 providing no obstruction for the hangers as they move.

One of the biggest problems in connection with a track as above described, for transporting articles carried by means of a hanger hung on the track, is in providing a means for moving the hangers around corners to facilitate the handling thereof. To accomplish this, I have provided a flexible track section as shown, in Fig. 6, which functions admirably for a corner member.

The flexible track sections include a pair of end members or couplings 8 which provide means for fastening the flexible sections to the rigid sections 1. The couplings have a central portion which is of the same diameter as the rigid track section to which they are to be attached, and a reduced portion on each side of the central portion which is provided with means, such as screw threads as shown, for attaching the coupling to the track sections, one set of threads 10 being standard thread and the other set 11 being round bottom threads, the purpose of which will become apparent later.

Each coupling 8 has an axial bore 12 therethrough to receive a flexible shaft 13, a set screw 14 being provided in each coupling to secure the shaft within the bore 12.

A length of closely wound coil spring 15 is installed on the couplings by being threaded on to the threads 11 with the flexible shaft extending through the coil 15 from one coupling to the other and aiding in holding the flexible track section together.

A spiral 16 is wound on the outer surface of the coil 15, the turn being in the same direction as the spiral on the rigid track sections 1, of course.

It is deemed apparent that when one of the flexible sections above described is coupled by means of the threads 10 to a rigid section which is driven or rotated, it will be rotated therewith irrespective of what reasonable bend is imparted to the flexible section, and that if a second rigid track section is connected to the end of the flexible section, the second rigid section will be driven or rotated through the flexible section from the first driven section. Thus, hangers may be carried, by the screw action of the track, along straight stretches and around corners, on to additional straight sections, and, if desired, additional corner or flexible sections, and straight sections may be added as long as the power available is sufficient.

In the flexible track sections above described, the flexible shaft 13 acts as the driving medium for the track sections by being rigidly secured to the rigid or straight track sections, by means of the coupling 8, the set screws 14 securing the shaft to the couplings. The coil 15 acts as the supporting means for the hangers, and the spiral 16, of course, moves the hangers as the track is rotated.

As means to support the flexible track sections, I employ trough-like bearings 17 which are shaped to the curvature of the corner desired, the bearings being supported on hooks 3 in the same manner as the bearings 4 are supported. The bearings 17 are preferably semi-circular in cross section as are the bearings 4.

It is deemed apparent that it is a simple matter to replace any of the bearings to lift them off of their hook and install a new one in place thereof.

Obviously, the hooks which support the track must all be on one side of the track so that the other side is open and the shank of the hanger hook may readily travel uninterruptedly along the track.

In Figs. 1, 2, and 3, I have illustrated a novel means whereby hangers may be transferred from one rotating screw track to another so that garments may be assembled on a desired track from different points throughout the plant.

To accomplish the transfer above mentioned, I employ a flexible track section, similar to that shown in Fig. 6, except that only one end has a coupling 8, and the opposite end carries a tapered end member 19, more clearly shown in Fig. 5 of the drawing. The end member 19 has an axial hole 20 therein to receive one end of the flexible shaft 21 (similar to the shaft 13 of the flexible sections) and a set screw 22 to secure the shaft 21 firmly in place. The opposite end of the shaft 21 is secured in the bore of a coupling 8 as previously described, and a coil 23 of closely wound wire, similar to the coil 15, is carried on the threaded portions of the coupling 8 and the end member 19. A spiral 24 is carried on the outer surface of the coil 23 to a point adjacent the tip or end member 19, the spiral forming a continuation of the spiral or screw on the adjacent straight track sections.

The transfer member is supported in the same manner as the other flexible members previously described, a hook 3 carries the curved, semi-circular saddle bearing 25, the latter having a stem 26 for engagement on the hook 3. The bearing 25 is supported at a slightly higher elevation than the track section to which garments are to be transferred, the curvature of the bearing being such as to carry the transfer member from an angular relation to the receiving track to substantially parallel relation with and directly over the receiving track. The free end of the transfer device is inclined downwardly so that the drop off point is as close as possible to the receiving track without interferring with the passage of hangers along the receiving track.

With the transfer device supported as above set forth, it may readily be seen that the hangers will travel along the flexible transfer member to the end thereof and drop off of the end member on to the receiving track therebelow and continue along the receiving track as desired.

As shown in the drawing, a pin 27 is employed through the stem 26 and the end of the hook 3 which supports the bearing 25 to keep the bearing at the desired inclination.

As shown in Fig. 3, a roller 6 is employed to hold the flexible transfer member seated in the bearing 25, and an elongated finger-like guard 28 is carried by the roller bracket and extends along the outer end of the transfer member in close proximity to the spiral on the coil. This guard 28 serves to hold the free end of the transfer member seated in the bearing 25, and also holds the hangers on the member.

The arrangement of rigid straight track sections and flexible corner track sections as shown in Fig. 1 with the transfer mechanism is one practical employment for my invention wherein garments, or other objects, on hangers may be displayed on the track and moved continuously around the circuit for display purposes such as in a retail store or show window, thus providing means for displaying more garments in a given space, and making the display more interesting due to the movement thereof which more readily attracts attention.

While it is not illustrated in the drawing, it is deemed apparent that if it should be desired to have a garment inspection point at some place along the spiral or screw track, such may be accomplished by omitting the spiral for a short distance so that garments, upon reaching the point where the screw ends, will not travel further, but the inspector may examine the garments, then push same along the track into a spiralled area again where they will continue their travel. Such an arrangement may be very desirable at some point along the route of the garments as they travel through the plant.

While I have here described my invention as for use primarily in dry cleaning establishments, it is deemed apparent that same may be used in meat packing, garment making, and other plants to great advantage.

Having thus described my invention, what I claim is:

1. A device for transporting objects on hooks comprising in combination, a pair of axially rotatable straight track sections having a screw-type outer surface, said tracks being disposed in angular relation to each other, and a flexible track section coupled between said straight sections forming a corner member to transport said hooks around bends, said flexible track comprising a closely wound coil having a spiral arranged on the outer surface thereof to form a continuation of the screw on said straight track sections, a rigid member at each end of said coil to carry the latter and attach same to and between said straight track sections, and a flexible shaft carried within said coil and being secured at opposite ends to each of said rigid members to rotate said flexible track with said straight track, and means for supporting said track in an elevated position.

2. Means for forming a continuous axially rotatable, screw-type conveyor track with two sections of a straight track disposed at an angle and in spaced relation to each other, one of said track sections being driven, comprising: a coupling member on the adjacent ends of each of said track sections, a flexible shaft secured at opposite ends to said coupling members to drive one of said sections from the driven section, a closely wound coil carried intermediate of said coupling members and surrounding said flexible shaft, said coil being of the same diameter as said track, and a spiral arranged on the outer surface of said coil to continue the screw of said straight sections.

3. Means for moving objects on hangers from one place to another comprising an axially rotatable, straight track having a screw-type outer surface on which said hangers are hung, bearings for supporting said track, and means for carrying said hangers around corners comprising a flexible track member having means at one end to couple with said straight track, a flexible shaft secured to said coupling means at one end and extending the length of said flexible member, a closely wound coil of substantially the same diameter as said straight track and carried by said coupling means the length of said flexible member, a spiral wire arranged on the outer surface of said coil to form a continuous screw with said straight track, a member at the opposite end of said coupling means to which said coil and said flexible shaft are attached, and a bearing of substantially semi-circular cross section and being shaped to the curvature of said flexible track member for supporting the latter.

4. A conveying system for objects on hooks comprising a plurality of straight, axially rotatable track sections having a screw-type outer surface and being disposed in angular relation to each other, one of said sections being a driven section, and flexible track sections joining adjacent ends of said angularly disposed straight sections, a trough-shaped bearing shaped to the curvature of said flexible sections to support same throughout substantially their entire length, said flexible sections having coupling means at each end to join with said straight sections and comprising a closely wound coil carried between said coupling means, said coil being of the same diameter as said track, a spiral arranged on the outer surface of said coil to form a continuation of the screw on said straight sections, and a flexible shaft connected between said coupling means for driving said track sections from said driven section.

5. Means to transfer objects carried on hooks from the end of one axially rotatable screw-type track to an intermediate portion of another similar track, said tracks being disposed at an angle and adjacent to each other comprising: a flexible member coupled at one end to said end of said first mentioned track, having a spiral on its outer surface, and being bent to extend over and substantially parallel with the second mentioned one of said tracks, and a trough-like bearing shaped to the curvature of said bend to support said flexible member and maintain same in its desired bend whereby said hooks may drop off of the free end of said flexible member on to the intermediate portion of said second mentioned track.

6. The structure as set forth in claim 5 and said flexible member comprising a closely wound coil having one end attached to said first mentioned track and the other end free, a tapered rigid end on said free end of said coil, and a flexible shaft carried within said coil and secured at one end to said rigid end and at the other end to said first mentioned track to rotate said flexible member with said track axially.

7. A flexible screw conveyor for transporting objects on hooks comprising a closely wound coil, a spiral arranged on the outside of said coil and in engagement with the outer surface thereof, rigid members on each end of said coil to carry the latter, and a flexible shaft within said coil and secured at opposite ends to said end members, and means to support said coil comprising a bearing of substantially semi-circular cross section and shaped longitudinally to the curvature of said coil to rotatably support same throughout substantially its entire length.

8. A device for transporting objects on hooks comprising in combination, a pair of axially rotatable straight track sections having a screw-type outer surface, said tracks being disposed in angular relation to each other, and a flexible track section coupled between said straight sections forming a corner member to transport said hooks around bends, said flexible track comprising a closely wound coil having a spiral arranged on the outer surface thereof to form a continuation of the screw on said straight track sections, a rigid member at each end of said coil to carry the latter and attach same to and between said straight track sections, and a flexible shaft carried within said coil and being secured at opposite ends to each of said rigid members to rotate said flexible track with said straight track, and means for supporting said track in an elevated position, said supporting means including an elongated saddle bearing of substantially semi-circular cross section and having a longitudinally arcuate shape in which said flexible track is carried throughout substantially its entire length.

9. Means for forming a continuous axially rotatable, screw-type conveyor track with two sections of a straight track disposed at an angle and in spaced relation to each other, one of said track sections being driven, comprising: a coupling member on the adjacent ends of each of said track sections, a flexible shaft secured at opposite ends to said coupling members to drive one of said sections from the driven section, a closely wound coil carried intermediate of said coupling members and surrounding said flexible shaft, said coil being of the same diameter as said track, a spiral arranged on the outer surface of said coil to continue the screw of said straight sections, and trough-like saddle bearings shaped longitudinally to the contour of said coil to rotatably support the latter throughout substantially its entire length.

CARL DAHLBERG.

REFERENCES CITED

The following references are of record in the file of this patent:

UNITED STATES PATENTS

| Number | Name | Date |
|---|---|---|
| 1,108,145 | Daniels | Aug. 25, 1914 |
| 1,896,386 | Williams | Feb. 7, 1933 |
| 1,984,659 | Simmons et al. | Dec. 18, 1934 |
| 2,045,757 | Constantin | June 30, 1936 |
| 2,438,637 | Jansen | Mar. 30, 1948 |